United States Patent [19]

Endo et al.

[11] Patent Number: 5,257,490
[45] Date of Patent: Nov. 2, 1993

[54] ANCHORING SYSTEM FOR INSTALLING EXTERIOR MATERIALS TO A BUILDING STRUCTURE

[76] Inventors: Shozo Endo, 7-23-10 Shakujii-Dai, Nerimaku, Tokyo, Japan; Youichi Endo, 20 Weil Place, Cresskill, N.J. 07626; Shuji Endo, 7-23-10 Shakujii-Dai, Nerimaku, Tokyo, Japan

[21] Appl. No.: 874,053

[22] Filed: Apr. 24, 1992

[51] Int. Cl.$^5$ .............................................. E04B 1/41
[52] U.S. Cl. ...................... 52/511; 52/506; 52/512; 52/746; 52/704
[58] Field of Search .............. 52/511, 508, 704, 787, 52/506, 511, 512, 746, 704; 411/178, 339, 508, 509, 510, 525, 526, 527

[56] References Cited

U.S. PATENT DOCUMENTS

| | | | |
|---|---|---|---|
| 4,097,061 | 6/1978 | Dietlein | 411/339 |
| 4,728,236 | 3/1988 | Kraus | 411/525 |
| 4,860,516 | 8/1989 | Koller et al. | 52/508 |
| 4,899,513 | 2/1990 | Morris | 52/511 |
| 4,984,947 | 1/1991 | Flauraud | 411/339 |

FOREIGN PATENT DOCUMENTS

| | | | |
|---|---|---|---|
| 1246980 | 8/1967 | Fed. Rep. of Germany | 52/511 |
| 2828438 | 3/1979 | Fed. Rep. of Germany | 411/178 |
| 598438 | 4/1978 | Switzerland | 52/512 |

OTHER PUBLICATIONS

Brochure P.U.F. (date unknown).

*Primary Examiner*—Carl D. Friedman
*Assistant Examiner*—Christopher T. Kent
*Attorney, Agent, or Firm*—John P. White; Peter J. Phillips

[57] ABSTRACT

The present invention relates to an anchoring system and method for installing exterior materials to a building structure particularly suited for when the exterior materials are to be placed at a distance from the building structure. The anchoring system utilizes a separator rod having two ends wherein one end is secured within a nut joint embedded in the exterior material and the other end is attached to an anchoring device anchored to the building structure. The anchoring device has a speed nut which accepts the other end of the separator rod, allowing the rod to advance into the anchoring device but which inhibits movement of the separator rod out of and away from the anchoring device in a rachet fashion.

12 Claims, 1 Drawing Sheet

ANCHORING SYSTEM FOR INSTALLING EXTERIOR MATERIALS TO A BUILDING STRUCTURE

BACKGROUND OF THE INVENTION

The present invention relates to an anchoring system for installing exterior materials to a building structure particularly suitable for when the exterior materials are to be spaced at a distance from the structure.

The use of insulation as a component of a building is now widely practiced to obtain better comfort and to conserve energy used for heating and cooling. However, if the insulation is placed between the structure and internal walls various problems can arise due to water condensation within the wall. There are also limitations of available wall constructions.

One solution to this problem is to place the insulation material outside the building structure. This method also gives a protection to the structure from the expansion and contraction caused by the temperature change at the various time of the year. Moreover, a building built with heavy materials such as concrete will store heat when the insulation is placed outside the structure.

Other benefits of having the exterior material cover the insulation material placed outside of a building structure include fire proofing and water proofing from the outside. Additionally, there are advantages in the weather proofing and protecting the structure from exterior impacts. Furthermore, the exterior materials would allow for a wide variety of design possibilities.

However, insulation materials are usually soft and can not hold heavy exterior materials. Also, the exterior materials placed at a distance from the structure exert great downward forces and are difficult to attach to the supporting structure. Consequently, these problems restrict the type of exterior materials that can be attached to an existing building structure, especially at distances from the structure, even though this would be ideal from the building science point of view. It also becomes difficult to attach and support exterior materials to a building structure. It is therefore important to have a connection system that is strong enough to support these exterior materials without being too difficult to attach.

This method and anchoring system solves the above problems so that exterior materials can be easily and securely attached to a building structure in order to obtain the benefits of having the insulation material placed outside of the structure.

Furthermore, since the method according to the invention is an easy installation method from outside of the structure, it saves labor time and can be placed on existing building structures with ease.

SUMMARY OF THE INVENTION

For the purpose of attaining the objects mentioned, the present invention provides an anchoring system for installing exterior materials to a building structure, comprising a separator rod having two ends, a nut joint embedded in a hole in the side face of material to be attached to the structure, the nut joint having means for receiving and holding one end of the separator rod while allowing the other end of the separator rod to extend from the side face of the material to be attached to the structure, an anchoring device for mounting into a hole of the structure, the anchoring device having a receiving aperture dimensioned to receive the other end of the separator rod, the anchoring device further comprising rachet means for allowing the other end of the separator rod to advance into the receiving aperture but for inhibiting movement of the separator rod out of the receiving aperture.

The present invention also provides an anchoring system for installing exterior materials to a building structure, comprising an anchoring device for mounting into a hole in the structure, the anchoring device having a receiving aperture, an enlarged end portion having a recess larger than the receiving aperture and having a threaded male exterior, a nut ring to be received within the end portion recess, the nut ring having flaps extending more radially inwardly than the diameter of the anchoring device receiving aperture, a cap having means for coupling with the anchoring device for holding the nut ring within the recess, and having an aperture to align with the fastening device aperture, a nut joint having means for mounting into a blind hole in the side face of material to be attached to the structure, the nut joint having an internally threaded receiving aperture, and a separator rod having threaded end portions, including a first end portion for threaded engagement within the internal nut joint receiving aperture, and a second end portion for extending from the side face of the material, for being received and held by the nut ring flaps when received in the anchoring device receiving aperture.

The present invention also provides a method for installing exterior materials to a building structure, comprising mounting an anchoring device into a hole in the structure, the anchoring device having a receiving aperture and flaps extending more radially inwardly than the diameter of the anchoring device receiving aperture, mounting a nut joint into a hole in the side face of material to be attached to the structure, the nut joint having internal engagement means, mounting a two ended separator rod into the nut joint so that one end is engaged by the internal engagement means, and so that the other end extends from the side face of material to be mounted to the structure, and inserting the other end of the separator rod into the anchoring device receiving aperture so that the flaps engage and hold the separator rod, whereby the exterior material is attached to the building structure.

DETAILED DESCRIPTION OF THE PREFERRED EMBODIMENT

Figure 1:
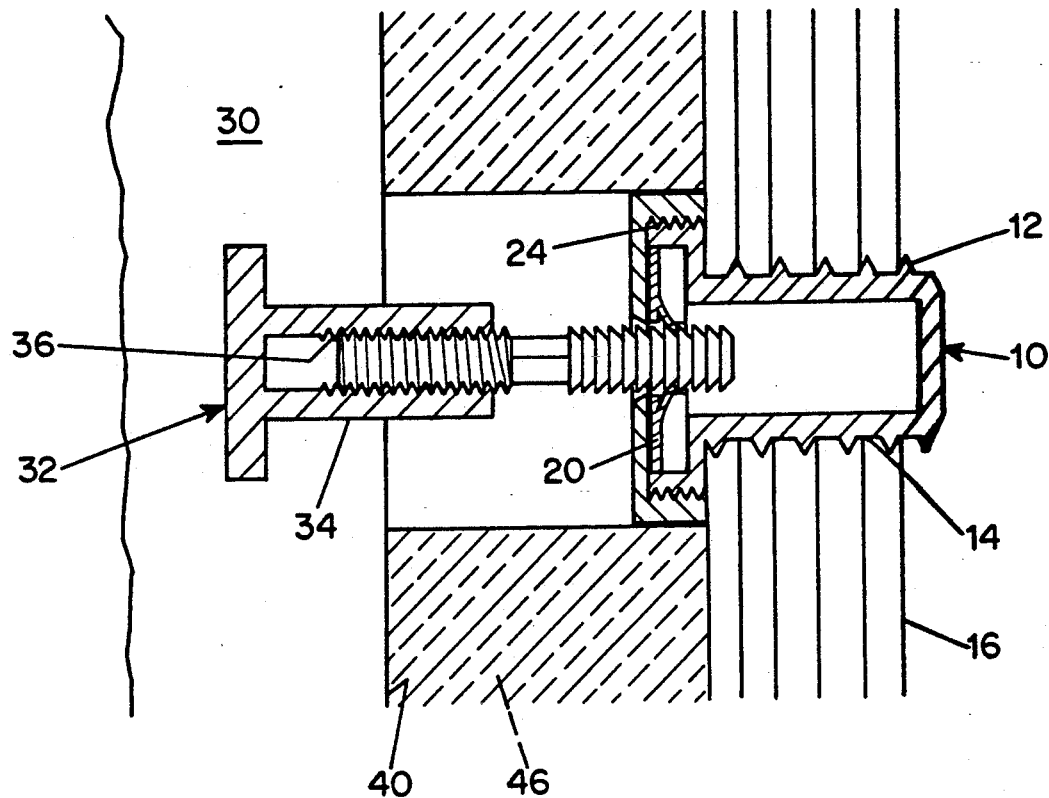
FIG. 1 is an elevational view, in cross-section of an embodiment of an anchoring system for installing exterior materials to a building structure according to the present invention.

The present invention provides an anchoring system for installing exterior materials to a building structure, comprising a separator rod having two ends, a nut joint embedded in a hole in the side face of material to be attached to the structure, the nut joint having means for receiving and holding one end of the separator rod while allowing the other end of the separator rod to extend from the side face of the material to be attached to the structure, an anchoring device for mounting into a hole of the structure, the anchoring device having a receiving aperture dimensioned to receive the other end of the separator rod, said anchoring device further comprising rachet means for allowing the other end of the separator rod to advance into the receiving aperture but for inhibiting movement of the separator rod out of the receiving aperture.

Preferably, the separator rod has two threaded ends. The nut joint is preferably embedded into a blind hole in the side of material to be attached to the structure. The nut joint may have a threaded female opening and one end of the separator rod has a correspondingly sized threaded male end. The rachet means may comprise flaps extending radially inwardly in the receiving aperture, and wherein the separator rod has an undulating surface on its other end for engagement with the flaps.

The anchoring device preferably comprises a fastening device having an exterior threaded surface for mounting in a hole of the structure. The anchoring system may further comprise an enlarged end portion, a speed nut received in the enlarged end portion, the speed nut having radially inwardly extending flaps, and means for retaining the speed nut in the enlarged end portion.

The means for retaining may comprise an exterior male thread on the enlarged end portion and a screw cap having an internally threaded female thread to mate with the thread on the enlarged end portion. The screw cap may have at least one flattened edge surface for aiding in threadingly engaging the screw cap to the enlarged end portion. The screw cap may have six flattened edge surfaces arranged to form a hexagon.

According to another aspect of the invention, a system for installing exterior materials to a building structure is provided, comprising an anchoring device for mounting into a hole in the structure, the anchoring device having a receiving aperture, an enlarged end portion having a recess larger than the receiving aperture and having a threaded male exterior, a nut ring to be received within the end portion recess, the nut ring having flaps extending more radially inwardly than the diameter of the anchoring device receiving aperture, a cap having means for coupling with the anchoring device for holding the nut ring within the recess, and having an aperture to align with the fastening device aperture, a nut joint having means for mounting into a blind hole in the side face of material to be attached to the structure, the nut joint having an internally threaded receiving aperture, and a separator rod having threaded end portions, including a first end portion for threaded engagement within the internal nut joint receiving aperture, and a second end portion for extending from the side face of the material, for being received and held by the nut ring flaps when received in the anchoring device receiving aperture.

According to another aspect of the invention, a method for installing exterior materials to a building structure is provided, comprising mounting an anchoring device into a hole in the structure, the fastening device having a receiving aperture and flaps extending more radially inwardly than the diameter of the anchoring device receiving aperture, mounting a nut joint into a hole in the side face of material to be attached to the structure, the nut joint having internal engagement means, mounting a two ended separator rod into the nut joint so that one end is engaged by the internal engagement means, and so that the other end extends from the side face of material to be mounted to the structure, and inserting the other end of the separator rod into the anchoring device receiving aperture so that the flaps engage and hold the separator rod, whereby the exterior material is attached to the building structure.

The present invention described herein is used to securely attach exterior materials to a building structure. The ability to accomplish this has become increasingly important in view of recent construction trends in using decorative exterior materials and in having insulation outside the building structure.

Figure 2:
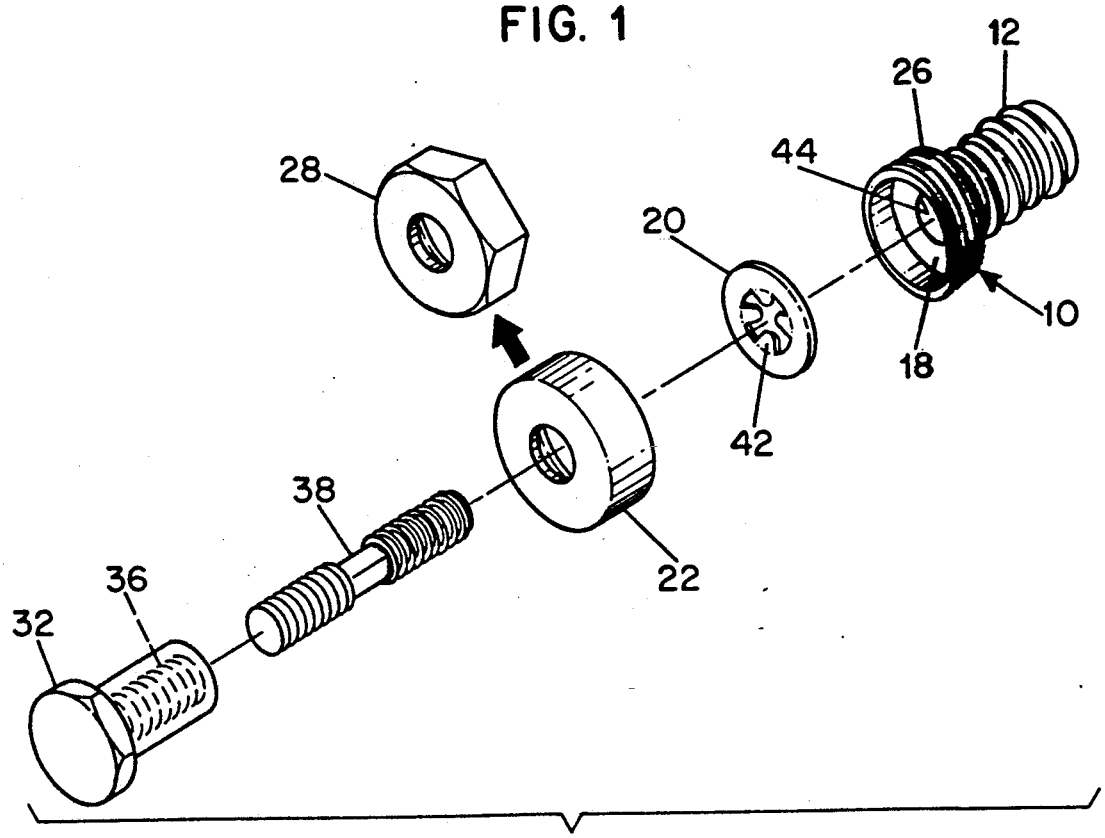
FIG. 2 is an exploded view of an embodiment of the anchoring system for installing exterior materials to a building structure according to the present invention.

In the preferred embodiment of the present invention as shown in FIGS. 1 and 2, an anchoring device 10 having external threads 12 adapted to be screwed into a hole 14 of a building structure 16. The anchoring device also includes a recessed portion 18 which contains and holds a speed nut mechanism 20 that is held in place by a screw cap 22. The screw cap 22 has internal threads 24 which threadingly engage external threads 26 on anchoring device 10. The screw cap 22 may be round as shown in the bottom of FIG. 2, or may have one or more flattened edge surfaces 28 (in this case 6) as shown in the top of FIG. 2 to aid in engaging and tightening the screw cap 22 to the anchoring device 10.

Exterior material 30 such as a panel of stone, e.g., which is to be attached to the building structure 16 has a nut joint 32 embedded in a blind hole 34. The nut joint 32 has an internally threaded receiving aperture 36.

A separator rod 38 has one end screwed into the threaded aperture 36 of the nut joint 32 and the other end extending out from the face 40 of the material 30 to be attached to the structure 16. The separator rod 38 has threads on the one end which screws in the nut joint 32, and has an undulating surface on the other end.

The speed nut ring mechanism 20 has a rachet means in the form of radially inwardly extending flaps 42 for engaging the other end of the separator rod received internally therein. The exterior material 30 may be attached to the structure 16 by inserting the other end of the separator rod 38 into the anchoring device 10. The speed nut mechanism 20 rachet arrangement allows the separator rod 38 to advance into a receiving aperture 44 in the anchoring device 10, but inhibits outward movement of the separator rod 38. The exterior material 30 is thus held in place relative to the building structure 16, which preferably has an insulation layer 46 on the outside of the structure 16.

While one embodiment of the invention has been shown and described, numerous variations and modifications will readily occur to those skilled in the art. The invention is thus not limited to the particular embodiment illustrated, and its scope should be determined only by way of the following claims.

What is claimed is:

1. An anchoring system for installing exterior material to a building structure, said material having a side face to be attached to the structure and a hole defined in said side face, said structure having a hole defined therein for mounting the material, comprising:

a separator rod having two ends;

a nut joint adapted to be embedded in the hole in the side face of material to be attached to the structure, said nut joint having means for receiving and holding one of said ends of the separator rod, while allowing the other of said ends of the separator rod to extend from the side face of the material to be attached to the structure;

an anchoring device for mounting into the hole of the structure, said anchoring device having a receiving aperture dimensioned to receive the other end of the separator rod, said anchoring device further comprising ratchet means for allowing the other end of the separator rod to advance into the receiving aperture and for inhibiting movement of the separator rod out of the receiving aperture.

2. The anchoring system according to claim 1, wherein the one end of the separator rod is threaded and the other end has an undulating surface.

3. The anchoring system according to claim 1, wherein the hole in the said face of material is a blind hole, and the nut joint is adapted to be embedded into the blind hole.

4. The anchoring system according to claim 1, wherein the nut joint has a threaded female opening and wherein the one end of the separator rod has a correspondingly sized threaded male end.

5. The anchoring system according to claim 1, wherein the rachet means comprises flaps extending radially inwardly in the receiving aperture, and wherein the separator rod has an undulating surface on its other end for engagement with the flaps.

6. The anchoring system according to claim 1, wherein the anchoring device comprises a fastening device having an exterior threaded surface for mounting in the hole of the structure.

7. The anchoring system according to claim 5, wherein the anchoring device comprises:
an enlarged end portion;
a speed nut received in said enlarged end portion, said speed nut having radially inwardly extending flaps; and
means for retaining the speed nut in the enlarged end portion.

8. The anchoring system according to claim 7, wherein the means for retaining comprises an exterior male thread on the enlarged end portion and a screw cap having an internally threaded female thread to mate with the thread on the enlarged end portion.

9. The anchoring system according to claim 8, wherein the screw cap has at least one flattened edge surface for aiding in threadingly engaging the screw cap to the enlarged end portion.

10. The anchoring system according to claim 9, wherein the screw cap has six flattened edge surfaces arranged to form a hexagon.

11. A system for installing exterior material to a building structure, said material having a side face to be attached to the structure and a hole defined in said side face, said structure having a hole defined therein for mounting the material, comprising:
an anchoring device for mounting into the hole in the structure, said anchoring device having a receiving aperture, an enlarged end portion having a recess larger than the receiving aperture and having a threaded male exterior;
a nut ring to be received within the end portion recess, said nut ring having flaps extending more radially inwardly than the diameter of the anchoring device receiving aperture;
a cap having means for coupling with the anchoring device for holding the nut ring within the recess, and having an aperture to align with the anchoring device aperture;
a nut joint means for mounting into the hole in the side face of material to be attached to the structure, said nut joint having an internally threaded receiving aperture; and
a separator rod having a first threaded end portion for threaded engagement within the internal nut joint receiving aperture, and a second undulating surfaced end portion for extending from the side face of the material, for being received and held by the nut ring flaps when received in the anchoring device receiving aperture.

12. A method for installing exterior material to a building structure, said material having a side face to be attached to the structure and a hole defined in said side face, said structure having a hole defined therein for mounting the material, comprising:
mounting an anchoring device into the hole in the structure, said fastening device having a receiving aperture and flaps extending more radially inwardly than the diameter of the
mounting a nut joint embedded into the hole in the side face of material to be attached to said structure, said nut joint having internal engagement means;
mounting a two ended separator rod into the nut joint so that one end is engaged by the internal engagement means, and so that the other end extends from the side face of material to be mounted to the structure; and
inserting the other end of the separator rod into the anchoring device receiving aperture so that the flaps engage and hold the separator rod, whereby the exterior material is attached to the building structure.

* * * * *

UNITED STATES PATENT AND TRADEMARK OFFICE
CERTIFICATE OF CORRECTION

PATENT NO. : 5,257,490
DATED : November 2, 1993
INVENTOR(S) : Youichi Endo, et al.

It is certified that error appears in the above-indentified patent and that said Letters Patent is hereby corrected as shown below:

Col. 6, line 35, after "diameter of the" insert --anchoring device receiving aperture--.

Signed and Sealed this

Eighteenth Day of April, 1995

Attest:

BRUCE LEHMAN

*Commissioner of Patents and Trademarks*

*Attesting Officer*